Oct. 30, 1928.  W. C. WALLIS  1,690,043
BOAT PROPULSION
Filed Feb. 18, 1927    2 Sheets-Sheet 1
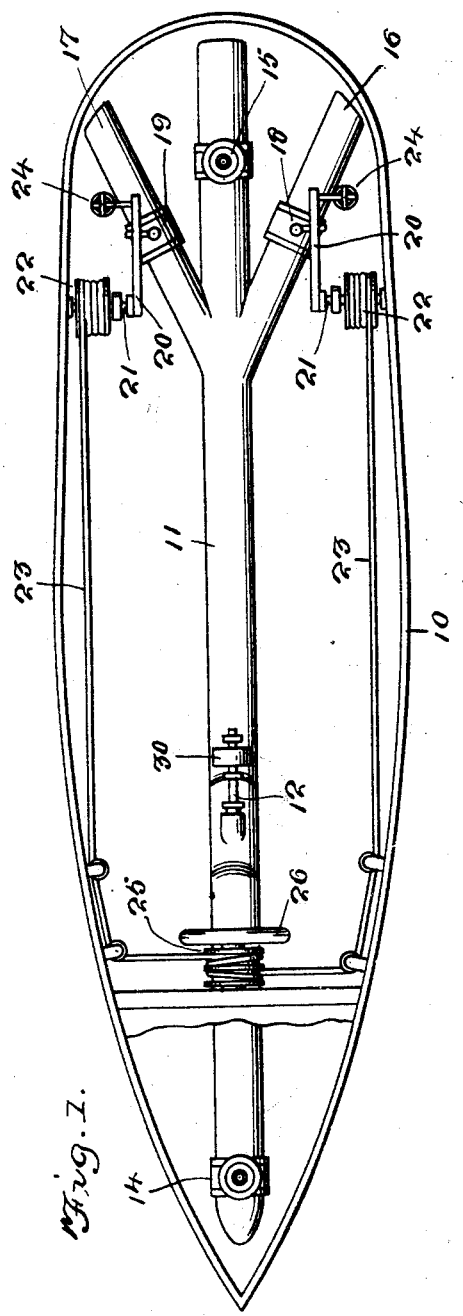
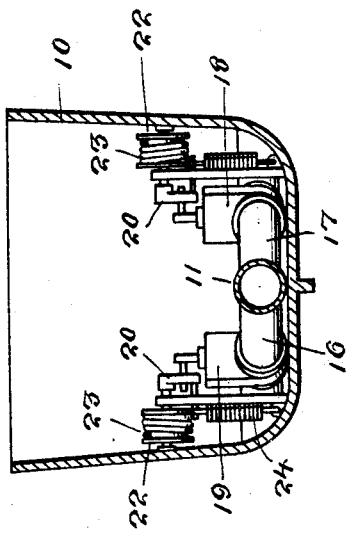
W. C. Wallis
INVENTOR
BY Victor J. Evans
ATTORNEY

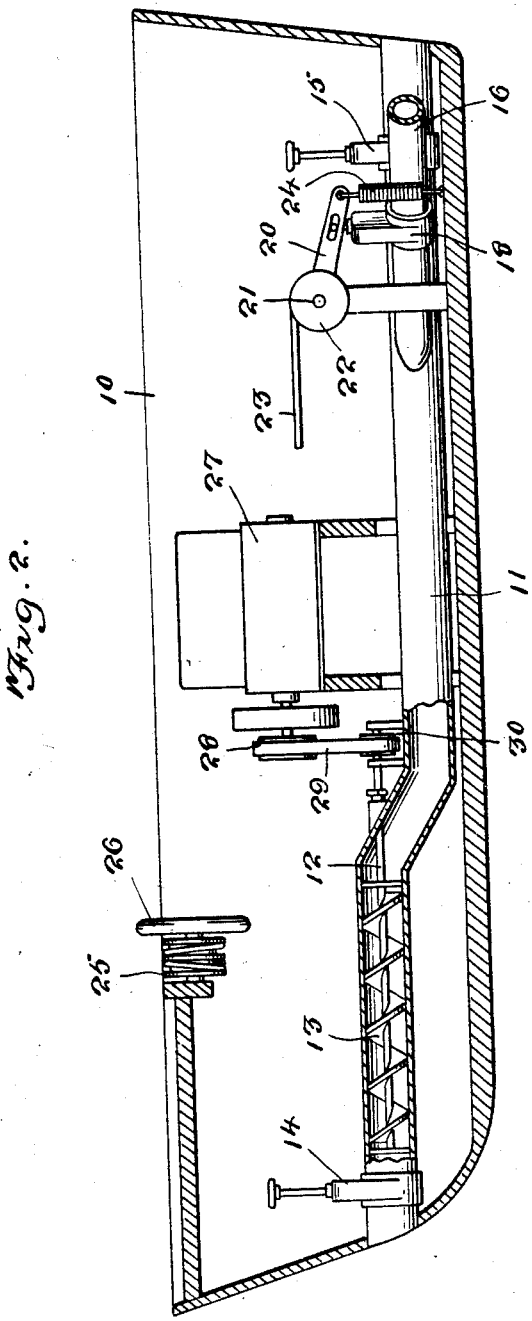

Patented Oct. 30, 1928.

1,690,043

UNITED STATES PATENT OFFICE.

WALTER C. WALLIS, OF CLOVIS, NEW MEXICO.

BOAT PROPULSION.

Application filed February 18, 1927. Serial No. 169,287.

This invention relates to improvements in vessels and has especial relation to propelling means for the same.

An object of the invention is to provide means for confining a volume of water to be acted upon by a propeller and thus provide a maximum amount of thrust, and a maximum speed for a given amount of power.

Another object of the invention is the provision of means whereby the propelling power of the boat may be utilized to control its course.

With the above and other objects in view, the invention further includes the following novel features and details of construction, to be hereinafter more fully described, illustrated in the accompanying drawings and pointed out in the appended claim.

In the drawings:—

Figure 1 is a plan view of a boat constructed in accordance with the invention.

Figure 2 is a longitudinal sectional view of the same and showing diagrammatically a source of power.

Figure 3 is a transverse sectional view.

Referring to the drawings in detail wherein like characters of reference denote corresponding parts, the reference character 10 indicates the hull of the boat which may be of any suitable type. Extending longitudinally through the hull is a conduit which is open at both its forward and rear ends. This conduit may be constructed in various ways. It may be built into the boat during the construction of the latter and may form a part of the hull, or it may be installed during or after construction and may be in the form of a pipe or the like. For the purpose of illustrating the invention, a pipe is shown and provides a main conduit 11, which as shown, extends throughout the length of the vessel. The length of the conduit however, depends upon the length of the vessel and in very long vessels it may be advisable to extend the conduit through only a portion of the hull. By this means water is directed through the vessel from the bow to the stern.

Mounted in suitable bearings within the conduit 11 is a propeller shaft 12 and mounted upon this shaft is a propeller 13 which may be of any suitable type. As the volume of water passing through the conduit is so confined as to prevent its movement laterally, a direct thrust will be exerted against this volume of water and the full affect of the propeller will result.

Suitable means may be provided for regulating the volume of water passing through the conduit and for preventing any water from passing through said conduit when desired. The means shown consists in a gate valve 14 which is located in the bow of the boat and a gate valve 15 located in the stern. It is preferred to provide the conduit with laterally extending branches 16 and 17 which have their inner ends in communication with the conduit near the stern of the boat and their outer ends extending outward and opening at the stern. These lateral branches are also provided with gate valves 18 and 19 respectively and by closing, or partly closing either one of the valves 18 or 19, the course of the boat may be regulated.

Suitable means may be provided for manipulating the valves 18 and 19 from a remote point, for example, from a pilot house or other position at the forward end of the boat. One of such means is shown in the form of an arm 20, one of these arms being associated with the stem of each of the valves 18 and 19. The arms 20 are each fast with the shaft 21 and mounted upon these shafts are drums 22 around which are wound cables 23. The opposite ends of the arms 20 are connected with springs 24 which serve to resist upward movement of this end of the arms. The cables 23 extend forward and are wound upon a drum 25 which has connected thereto a steering wheel 26. It will be seen by reference to the drawings that operation of the steering wheel will control the valves 18 and 19 and regulate the volume of water passing through the lateral branches 16 and 17 so as to control the course of the vessel.

In Figure 2 there is illustrated diagrammatically a motor 27, whose shaft has mounted thereon a pulley 28 which, by means of a belt 29, drives a pulley 30 mounted upon the propeller shaft 12.

The invention is susceptible of various changes in its form, proportions and minor details of construction and the right is herein reserved to make such changes as properly fall within the scope of the appended claim.

Having described the invention what is claimed is:—

In a vessel having a hull, steering and propelling means comprising a conduit extending longitudinally of the hull and having both ends open, valves at the forward and rear ends of the conduit for controlling passage of water therethrough, a propeller located within the intermediate portion of the conduit, means for driving the propeller, branch conduits communicating and connected with the first named conduits at an intermediate point in advance of the rear valve, gate valves located within said branch conduits, spring pressed pivoted levers connected with said gate valves, winding drums located adjacent said levers and connected therewith, a control windlass located at a remote point and provided with manual turning means, and flexible members trained and wrapped about and upon said windlass, trained over guide pulleys and secured to and wrapped about said drums whereby one or the other of said gate valves may be opened and the other closed from the remote point.

In testimony whereof I affix my signature.

WALTER C. WALLIS.